United States Patent [19]

Koebernik

[11] Patent Number: 5,435,181
[45] Date of Patent: Jul. 25, 1995

[54] ELECTRONIC FLOAT GAUGE

[75] Inventor: Ronald E. Koebernik, Cedarburg, Wis.

[73] Assignee: The Kelch Corporation, Mequon, Wis.

[21] Appl. No.: 128,493

[22] Filed: Sep. 29, 1993

[51] Int. Cl.$^6$ .................. G01F 23/52; H01H 36/00
[52] U.S. Cl. .................. 73/313; 73/320; 73/DIG. 5; 200/84 C; 338/33
[58] Field of Search ............ 73/313, 320, DIG. 5; 200/84 C; 338/33; 340/623, 624, 625

[56] References Cited

U.S. PATENT DOCUMENTS

| | | | |
|---|---|---|---|
| 1,253,324 | 1/1918 | Windridge. | |
| 1,304,022 | 5/1919 | Cole | 73/320 |
| 1,371,395 | 3/1921 | Rast | 116/228 |
| 2,405,140 | 8/1946 | Grimm | 73/308 |
| 2,999,914 | 9/1961 | Stanaway | 200/87 |
| 3,060,291 | 10/1962 | Clare | 200/87 |
| 3,210,498 | 10/1965 | Jackson et al. | 200/87 |
| 3,277,413 | 10/1966 | Kropp et al. | 335/152 |
| 3,473,381 | 10/1969 | Allen, Jr. | 73/313 |
| 3,660,789 | 5/1972 | Weisenberger | 335/206 |
| 3,662,196 | 5/1972 | Ruschmann | 310/68 B |
| 3,709,038 | 1/1973 | Werner | 73/313 |
| 3,719,887 | 3/1973 | Shimizu et al. | 324/171 |
| 3,759,286 | 9/1973 | Page | 137/392 |
| 3,976,963 | 8/1976 | Kübler | 200/84 C X |
| 4,384,184 | 5/1982 | Alvarez | 200/84 C |
| 4,389,627 | 6/1983 | Uesugi et al. | 335/206 |
| 4,567,763 | 2/1986 | Schiffbauer | 73/432 A |
| 4,831,350 | 5/1989 | Rose | 335/205 |
| 4,976,146 | 12/1990 | Senghaas et al. | 73/313 |
| 5,148,709 | 9/1992 | Ross, Jr. | 73/320 |
| 5,224,379 | 7/1993 | Koebernik et al. | 73/308 |

OTHER PUBLICATIONS

An undated admitted prior art, advertisement by Isspro, Inc. entitled "Ultimate Fuel Level Sender".

*Primary Examiner*—William A. Cuchlinski, Jr.
*Assistant Examiner*—Willie Morris Worth
*Attorney, Agent, or Firm*—Quarles & Brady

[57] ABSTRACT

Disclosed herein is an electronic float gauge for indicating the level of liquid in a tank. A float follows the liquid level and causes a rotor that has magnets on it to rotate. Surrounding the magnets, in a concentric array, are a series of reed switches. The rotation of the magnets feeds information to the reed switches about the level of fluid in the tank. The reed switches are connected to a fluid level indicator.

6 Claims, 2 Drawing Sheets

ELECTRONIC FLOAT GAUGE

BACKGROUND OF THE INVENTION

1. Field Of The Invention

This invention relates to electronic float activated gauges which report information on the level of liquid in a tank.

2. Description Of The Art

Various types of float activated electronic gauges are known. Examples are U.S. Pat. No. 5,224,379 (a magnet affixed to a float moves vertically past a magnetic reed switch so as to turn on an indicator light); U.S. Pat. No. 2,405,140 (motion of a float causes rotation of a magnet, which in turn causes pivoting of an arm to light indicators); and U.S. Pat. No. 3,709,038 (float rotates a complex magnetic coupling).

While these prior art gauges each have their own advantages, it is desirable to provide a compact float gauge which minimizes the number of moving parts and the size of the magnet required, isolates the electric wiring from the fluid, reduces signal chattering in response to transient level changes, provides feedback at multiple different levels in the tank, and avoids the need for different wiring when larger tanks are used. Also, such a gauge should preferably be reliable in a high vibration environment (e.g. when used on a snowmobile gas tank). These goals should be achieved while keeping the costs of manufacturing and assembly of the gauge low. To date, no electronic float gauge has met all of these needs.

SUMMARY OF THE INVENTION

In one aspect, the present invention provides float activated gauge for measuring the level of liquid in a tank. There is a cover suitable to cover a hole in a tank wall and a float mounted under the cover so as to be able, when positioned in the tank, to rise and fall with the level of liquid in the tank. There is also a guide connected to the cover and insertable into the tank that restricts rotational movement of the float while permitting limited vertical movement of the float.

A rotor is mounted under the cover and above the float so that it rotates in response to float vertical movement. A magnet is mounted on the rotor to rotate therewith. There are also a plurality of reed switches mounted to the cover around a rotational axis of the rotor and radially disposed with respect thereto. The reed switches form part of a circuit for sensing the rotational position of the rotor around its rotational axis. Vertical movement of the float in response to fluid level changes in the tank can, when the float is positioned in the tank, cause rotation of the magnet inside the array of reed switches.

Preferably there are a plurality of rod magnets mounted to the rotor that have their magnetic polarity aligned. The rotor also has mounted to it a shunt for restricting the magnetic field of the magnet. Also preferably, the magnets can rotate inside and past the array of reed switches, the reed switches are part of a circuit containing at least one resistor where the closing of a reed switch can enable the circuit path the resistor is in to be bypassed, and there is an electrical fluid level indicator.

The gauge of the present invention can be designed so that relatively inexpensive rod magnets can be placed in a plastic rotor coupling (rather than using a single large magnet). Further, the magnets can have their north poles aligned such that the magnetic force of the "north" field is grouped together and focused at a height where the reed switches are mounted. This maximizes the magnetic effect, and minimizing chattering that could occur when the north, center, and south ends of a magnet move past a reed switch in vertical movement systems.

The shunt provides a clear cut-off for the magnetic field. Preferably the shunt is a metal nail or other ferromagnetic mass.

Placing the electrical components in the cap isolates them from the fluid. This reduces problems which might be caused by exposing the circuit to fluid (or fumes from fluid). It also avoids the need for varied length wires (which would be required if the reed switches were instead aligned along the vertical pathway of the float).

The gauge can also be provided with an enclosed tube around the float so that the float will not respond as quickly to splashing that might occur as a snowmobile or other vehicle travels over bumps.

An especially important advantage of the present invention is that the gauge eliminates the need for there to be scraping (or tipping) physical contact between the rotor and a contact of the reed switch. Thus, complex pivoting mechanisms, wipers or the like are not required. This results in a compact, reliable, and inexpensive system.

The objects of the invention therefore include providing a float gauge of the above kind:

(a) with rotation of a magnet inside a concentrically arranged array of reed switches;
(b) which is relatively inexpensive to produce and permits multiple electronic output signals;
(c) which has a well defined terminus to the magnetic field; and
(d) which is well suited for use in high vibration environments.

These and still other objects and advantages of the invention will be apparent from the description which follows. The preferred embodiments will be described with reference to the accompanying drawings. These embodiments do not represent the full scope of the invention. Rather the invention may be employed in other embodiments. Reference should therefore be made to the claims herein for interpreting the full breadth of the invention.

DESCRIPTION OF THE PREFERRED EMBODIMENTS

Figure 1:
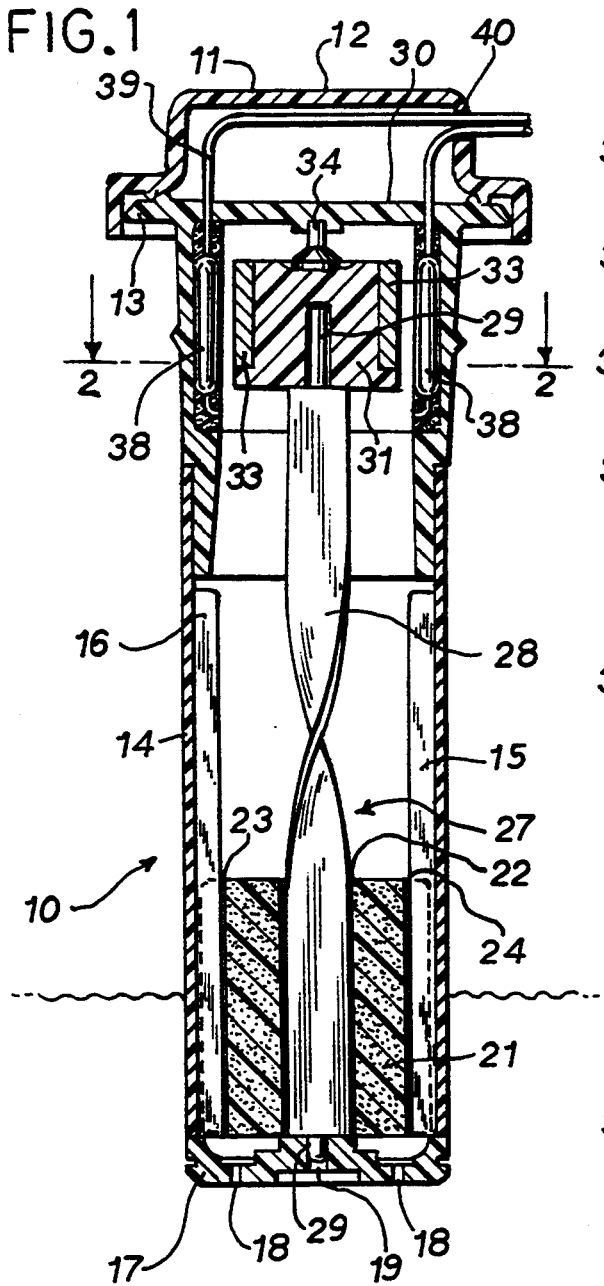
FIG. 1 is a cross-sectional view of a gauge embodying the present invention, showing the float when the tank is empty.

A gauge (generally 10) has a cap 11 which is made up of an upper part 12 and a lower part 13. The lower part 13 is mounted to a tube 14 that has opposed longitudinally extending internal ribs 15, 16 along its sides. There is also a bottom cap 17 at the bottom of the tube 14. There are small apertures 18 in the bottom cap 17 for permitting liquid in, and a central bearing hole 19.

Float 21 has a central rectangular slot 22. It also has opposed peripheral vertically extending slots 23 and 24 which receive ribs 15 and 16.

As the fluid in the tank rises, the fluid inside the tube cavity 27 will also rise as fluid enters holes 18. This in turn causes the float 21 to rise in the tube. The float is prevented from rotation by the guide ribs 15 and 16. However, vertical movement of the float in the tube is permitted. As the float rises, it causes a helical flat strip 28 (with peg ends 29) to rotate. Rotation of the strip 28 rotates rotor 31 due to the tight fit of upper peg 29 in a lower central rotor bore. Note the rotationally permissive mounting in pivot hole 19 and in bearing 30 in the cap part 13. Up from the top of the rotor 31 extends an additional peg 34 that rotates in bearing 30.

Inside the rotor 31 are a series of vertical bores which receive a plurality of rod magnets 32 and a metal nail (or other shunt) 33.

Figure 3:
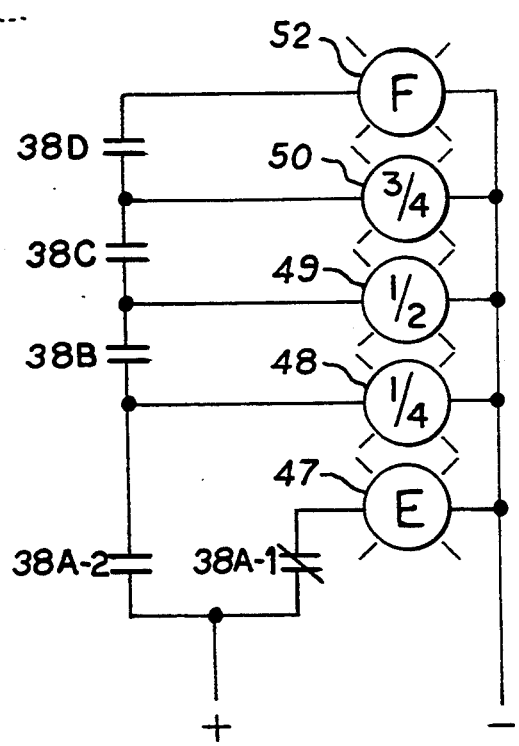
FIG. 3 is a schematic of one possible circuit for use with the FIG. 1 embodiment.

Vertical movement of the float in response to fluid level changes rotates the rotor 21, and thereby rotates the magnet array around the rotational axis of the rotor. Around the outside of the rotor (inside the cap part 13) are a second group of vertical bores that house reed switches 38 (a/k/a 38A-I). See also 38A-1 and 38A-2 in FIG. 3. These reed switches have wires 39 extending therefrom through a hole 40 in cap part 12. The wires lead to a liquid level indicator (such as a series of lights 41-46 or 47-51) on an indicator panel.

Figure 2:
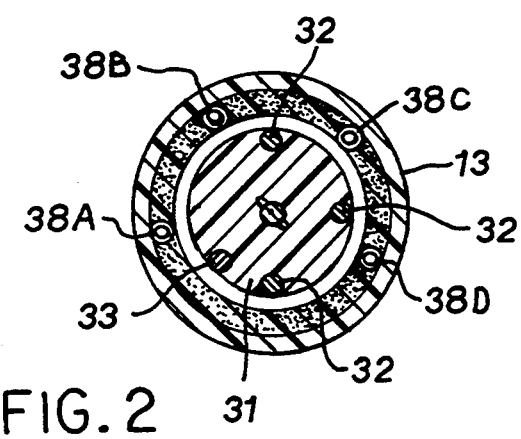
FIG. 2 is a sectional view taken on line 2—2 of FIG. 1.

FIG. 2 shows the gauge in the "tank empty" position. The nail 33 substantially blocks the magnetic flux from the magnets from reaching the magnetic reed switch 38A. The magnetic reed switch 38A is preferably a double pole type switch (38A-1/38A-2) where absent a magnetic field the switch 38A-1 leading to the E light is closed and 38A-2 is open. In this position only the "E" light is lit.

When the rotor rotates in response to the tank being more filled, the shunt 33 moves to a position where it no longer is effective in blocking the magnetic field from switch 38A. When this happens, the switch 38A-1 opens and switch 38A-2 closes. As a result, the empty light goes off and the ¼ filled light goes on. It will be appreciated that as the rotor then rotates more in response to higher fluid levels, more and more of the other lights go on (multiple lights are lit) as the reed switches sense the field (and close).

Figure 4:
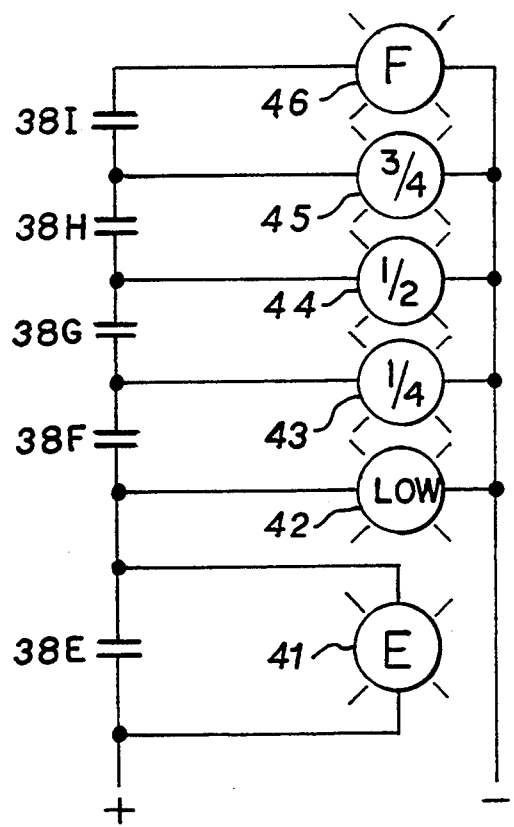
FIG. 4 is a schematic of a second possible circuit for use with the FIG. 1 embodiment (albeit with a different array of magnets and reed switches than that shown in FIG. 2)

An alternative circuit is shown in FIG. 4. Instead of using the double pole type switch and FIG. 2 array, one sets up the array of magnets and reed switches so that initially the magnetic field is blocked from switches 38F-I. Here the "E" light is on and the low light weak. As the rotor turns and switch 38E closes, the E light shorts out and the low light glows brighter. As more switches close, more and more lights are lit.

Figure 5:
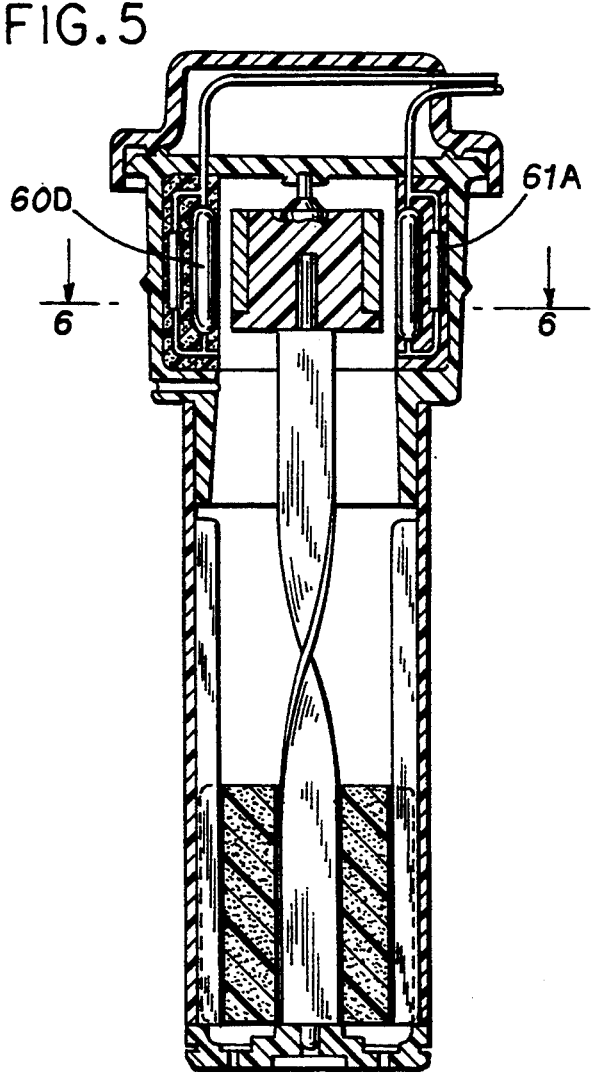
FIG. 5 is a cross-sectional view of another float activated gauge embodying the present invention, which provides resistors between reed switches.
Figure 6:
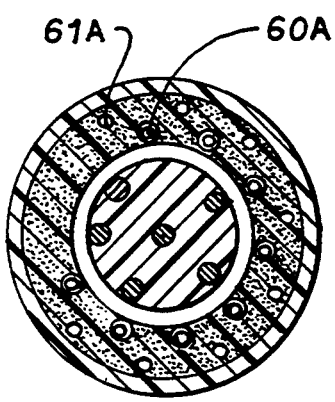
FIG. 6 is a sectional view taken on line 6—6 of FIG. 5.
Figure 7:
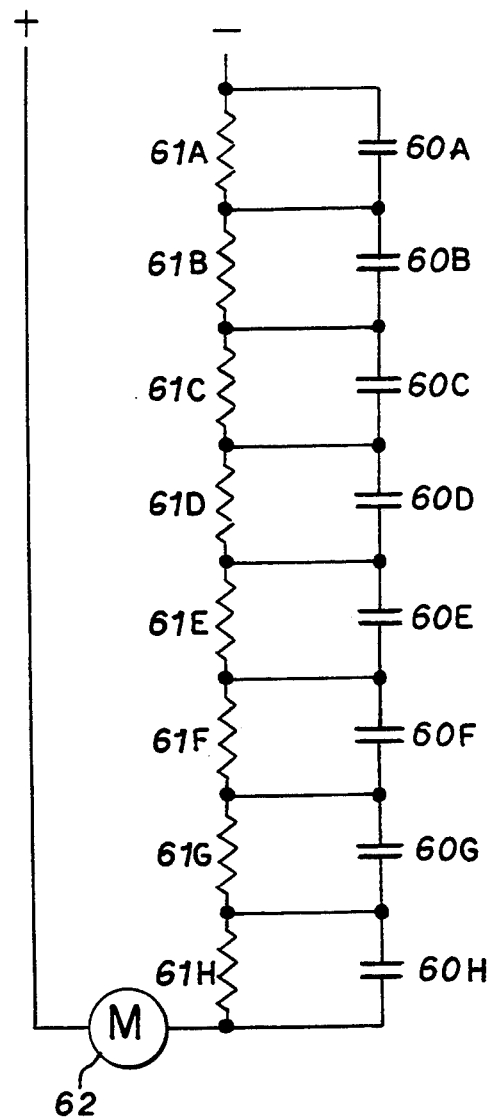
FIG. 7 is a schematic of a circuit that can be used with the FIG. 5 embodiment.

Another alternative embodiment is shown in FIGS. 5-7 where the lower part of the gauge is the same. The difference is in the circuit used, the indicator, the magnetic array, and the array of the relays.

As shown in FIG. 7, the circuit can be set up so that reed switches 60A-H are linked such that there is (in one possible path) resistors 61A-H between them. As the magnets in the rotor energize each reed switch, a slightly "easier" pathway for the electricity to follow is provided (as the corresponding resistor can be by-passed). Thus, the reading on the volt meter or other indicator 62 will be somewhat more than if the switch were not closed. As more and more of the reed switches 60A-H are closed (as the rotor rotates), the effective resistance of the circuit goes down and the reading on the meter 62 goes progressively up.

It will be appreciated that cap parts 12 and 13 can be made to snap, glue, thread, or otherwise attach together. Similarly tube 14 can be connected to cap part 13 via threads, adhesives, friction fit or any other technique. Similarly, the bottom part 17 can be attached to the tube 14 by adhesives, screw threads or other techniques.

The preferred materials for parts 12, 13, 14, and 17 are plastics. The preferred float 21 is made of a foamed thermoplastic material. The preferred strip 28 is made of a metal. The preferred material for the rotor body 31 is molded plastic with internally formed cavities. A possible indicator for the FIG. 7 embodiment is a volt meter with the numbers replaced by fill level markings. Reed switches suitable for the invention are available from Hamlin Inc. of Lake Mills, Wis. A preferred power source for the circuit is the electrical system of a motor vehicle (e.g. snowmobile tractor).

With respect to the FIG. 7 embodiment, stepped variable resistance can be read out as an analog or digital value representing the degree of vessel fill. An indicator could be configured as a numerical, liquid crystal, light emitting diode, bar graph, or other display.

Although the preferred embodiments of the invention are described above, the claims are not so restricted. There may be various other modifications and changes to the preferred embodiments which are within the scope of the invention. For example, the exact number of magnets or reed switches shown in the preferred array is not critical. Thus, the invention is not to be limited by the specific description above, but should be judged by the claims which follow.

I claim:

1. A float activated gauge for measuring the level of liquid in a tank, the gauge being connectable to a power source, the gauge comprising:

a cover suitable to cover a hole in a tank wall;

a rotor mounted to an underside of the cover for rotation about a rotation axis, the rotor including a spiral strip extending downwardly along the rotation axis;

a float mounted under the rotor on the spiral strip so as to be able, when positioned in the tank, to rise and fall with the level of liquid in the tank;

a guide connected to and below the cover and insertable into the tank that restricts rotational movement of the float while permitting limited vertical movement of the float;

a magnet mounted on the rotor to rotate therewith;

a plurality of reed switches mounted to the cover in an array around the rotor, the reed switches defining a circuit for sensing the rotational position of the rotor around the rotation axis;

an indicator for indicating the level of fluid in the tank; and wiring connecting said indicator to said reed switches and for connecting said indicator and reed switches to the power source;

whereby vertical movement of the float in response to fluid level changes in the tank can, when the float is positioned in the tank, cause rotation of the strip which as a result rotates the rotor and the magnet inside the array of reed switches, the magnet producing a magnetic field that is sensed by any one of said plurality of reed switches when the magnet is positioned adjacent said any one of said plurality of reed switches.

2. The gauge of claim 1, wherein there are a plurality of rod magnets mounted to the rotor that have their magnetic polarity aligned with each other.

3. The gauge of claim 1, wherein the rotor also has mounted thereto a shunt for restricting the scope of the magnetic field of the magnet adjacent the reed switches from a portion of a circumference around the rotor's rotational axis.

4. The gauge of claim 1, wherein the magnet rotates inside the array of reed switches.

5. The gauge of claim 1, wherein the circuit contains at least one resistor, whereby the closing of one of said plurality of reed switches can enable said resistor to be bypassed.

6. The gauge of claim 1, wherein the indicator is an array of lights.

* * * * *